(12) United States Patent
Ravishankar

(10) Patent No.: US 11,234,293 B2
(45) Date of Patent: Jan. 25, 2022

(54) LOW DATA RATE BROADCAST USING LOW EARTH ORBIT (LEO) SATELLITES

(71) Applicant: HUGHES NETWORK SYSTEMS, LLC, Germantown, MD (US)

(72) Inventor: Channasandra Ravishankar, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 80 days.

(21) Appl. No.: 16/849,893

(22) Filed: Apr. 15, 2020

(65) Prior Publication Data

US 2020/0329527 A1    Oct. 15, 2020

Related U.S. Application Data

(60) Provisional application No. 62/834,308, filed on Apr. 15, 2019.

(51) Int. Cl.
| | |
|---|---|
| *H04B 7/204* | (2006.01) |
| *H04W 84/06* | (2009.01) |
| *H04W 72/00* | (2009.01) |
| *H04W 72/04* | (2009.01) |
| *H04W 4/06* | (2009.01) |
| *H04W 28/06* | (2009.01) |

(Continued)

(52) U.S. Cl.
CPC ......... *H04W 84/06* (2013.01); *H03M 7/3088* (2013.01); *H04J 13/0048* (2013.01); *H04L 9/0838* (2013.01); *H04L 9/0861* (2013.01); *H04L 41/0896* (2013.01); *H04L 63/0435* (2013.01); *H04W 4/06* (2013.01); *H04W 28/06* (2013.01); *H04W 72/005* (2013.01); *H04W 72/042* (2013.01); *H04W 88/16* (2013.01)

(58) Field of Classification Search
CPC ... H04B 7/18582; H04L 9/083; H04L 9/0894; H04L 1/0003; H04L 5/0007; H04L 5/0023; H04L 41/0896; H04L 9/0838; H04L 9/0861; H04L 63/0435; H04L 63/0428; H04W 16/14; H04W 84/06; H04W 72/005; H04W 72/042; H04W 4/06; H04W 28/06; H04W 88/16; H04J 13/0048; H04J 13/20; H03M 7/6029; H03M 7/3084; H03M 7/40; H03M 7/3088

See application file for complete search history.

(56) References Cited

U.S. PATENT DOCUMENTS 6,202,210 B1 *  3/2001  Ludtke ................. H04N 21/435
                                                        725/20
6,928,423 B1 *  8/2005  Yamanaka ......... G06Q 20/1235
                                                      348/E5.004

(Continued)

*Primary Examiner* — Phuongchau Ba Nguyen
(74) *Attorney, Agent, or Firm* — Jones Robb, PLLC

(57) ABSTRACT

A system is disclosed for providing low data rate broadcast services. Different types of broadcast packets are detected among data packets received an external network. The different types broadcast packets contain different a different broadcast content. When a particular type of broadcast packet is detected, a transmit data rate is selected and Walsh codes are assigned for achieving the transmit data rate. Data packets corresponding to the broadcast packets are compressed, and at least one RLC block containing the compressed data packets is created. The RLC blocks are transmitted from a satellite using the assigned Walsh codes.

30 Claims, 9 Drawing Sheets

(51) Int. Cl.
*H04J 13/00* (2011.01)
*H04L 12/24* (2006.01)
*H04L 9/08* (2006.01)
*H04L 29/06* (2006.01)
*H03M 7/30* (2006.01)
*H04W 88/16* (2009.01)

(56) References Cited

U.S. PATENT DOCUMENTS

| | | | |
|---|---|---|---|
| 7,260,842 B2 * | 8/2007 | Hirayama | G06Q 30/0207 |
| | | | 726/21 |
| 7,917,130 B1 * | 3/2011 | Christensen | H04W 4/06 |
| | | | 455/414.4 |
| 9,451,401 B2 * | 9/2016 | Lo | H04W 4/02 |

\* cited by examiner

LOW DATA RATE BROADCAST USING LOW EARTH ORBIT (LEO) SATELLITES

CROSS-REFERENCE TO RELATED APPLICATION

The present application claims priority to U.S. Provisional Patent Application No. 62/834,308 filed Apr. 15, 2019, and entitled "Low Rate Broadcast Using Low Earth Orbit (Leo) Satellites", the entire disclosure of which is incorporated herein by reference.

BACKGROUND INFORMATION

Consumer mobile devices are increasingly being used for a variety of functions in addition to conventional voice communication. For example, consumers often use mobile phones and other handheld devices to access audio and video content for personal enjoyment. These mobile devices typically access audio and video content using applications which utilize data connection networks. For example, devices such as mobile phones can access cellular data networks, satellite data networks, or available wi-fi networks in order to establish a data connection to services providing video and/or audio content.

Certain types of content only transmission from a service provider with little, or no, interactive communication with user devices. Such content can include, for example, traffic, weather, emergency warnings, etc. that can be simultaneously broadcast to multiple users. While such content can be easily provided to consumers using cellular networks, various complications can be encountered when satellite networks are used. For example, such content can sometimes require bidirectional communication to authenticate users subscribing to the service. Bandwidth limitations in the satellite network can also restrict services that may utilize excessive airtime or require bidirectional communication. It can also be difficult to allocate permanent satellite bandwidth for such services.

Based on the foregoing, there is a need for an approach for providing broadcast services directly to mobile devices using low earth orbit (LEO) satellites without the need bidirectional communication with the terminal.

BRIEF SUMMARY

A system and method are disclosed for broadcasting various types of content at a low data rate. According to an embodiment, the system includes a gateway configured to: receive data packets from an external network; detect at least one type of broadcast packet from the received packet data, each type of broadcast packet containing a different broadcast content; select, for each type of broadcast packet detected, a transmit data rate and one or more Walsh codes for achieving the transmit data rate, each Walsh code being selected from a lowest level of a code tree and having a highest spread factor in the code tree; transmit the one or more Walsh codes selected for each type of broadcast packet over a broadcast control channel; compress the data packets for each type of broadcast packets; create, for each type of broadcast packet, at least one RLC block containing the corresponding compressed data packets based, at least in part, on the number of Walsh codes selected; and transmit, for each type of broadcast packet, the at least one RLC block, via a satellite in a satellite network, using the one or more Walsh codes selected for the type of broadcast packet. The system further includes one or more terminals configured to: receive the at least one RLC block for a selected type of broadcast packet from the satellite; recover broadcast content contained in the selected type of broadcast packets; and supply the recovered broadcast content to one or more broadcast clients.

According to another embodiment the method includes: receiving data packets from an external network; detecting at least one type of broadcast packet from the received packet data, each type of broadcast packet containing a different broadcast content; selecting, for each type of broadcast packet detected, a transmit data rate and one or more Walsh codes for achieving the transmit data rate, each Walsh code being selected from a lowest level of a code tree and having a highest spread factor in the code tree; transmitting the one or more Walsh codes selected for each type of broadcast packet over a broadcast control channel; compressing the data packets for each type of broadcast packets; creating, for each type of broadcast packet, at least one RLC block containing the corresponding compressed data packets based, at least in part, on the number of Walsh codes selected; and transmitting, for each type of broadcast packet, the at least one RLC block from a satellite in a satellite network using the one or more Walsh codes selected for the type of broadcast packet.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

A system and method for providing a low data rate broadcast service are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
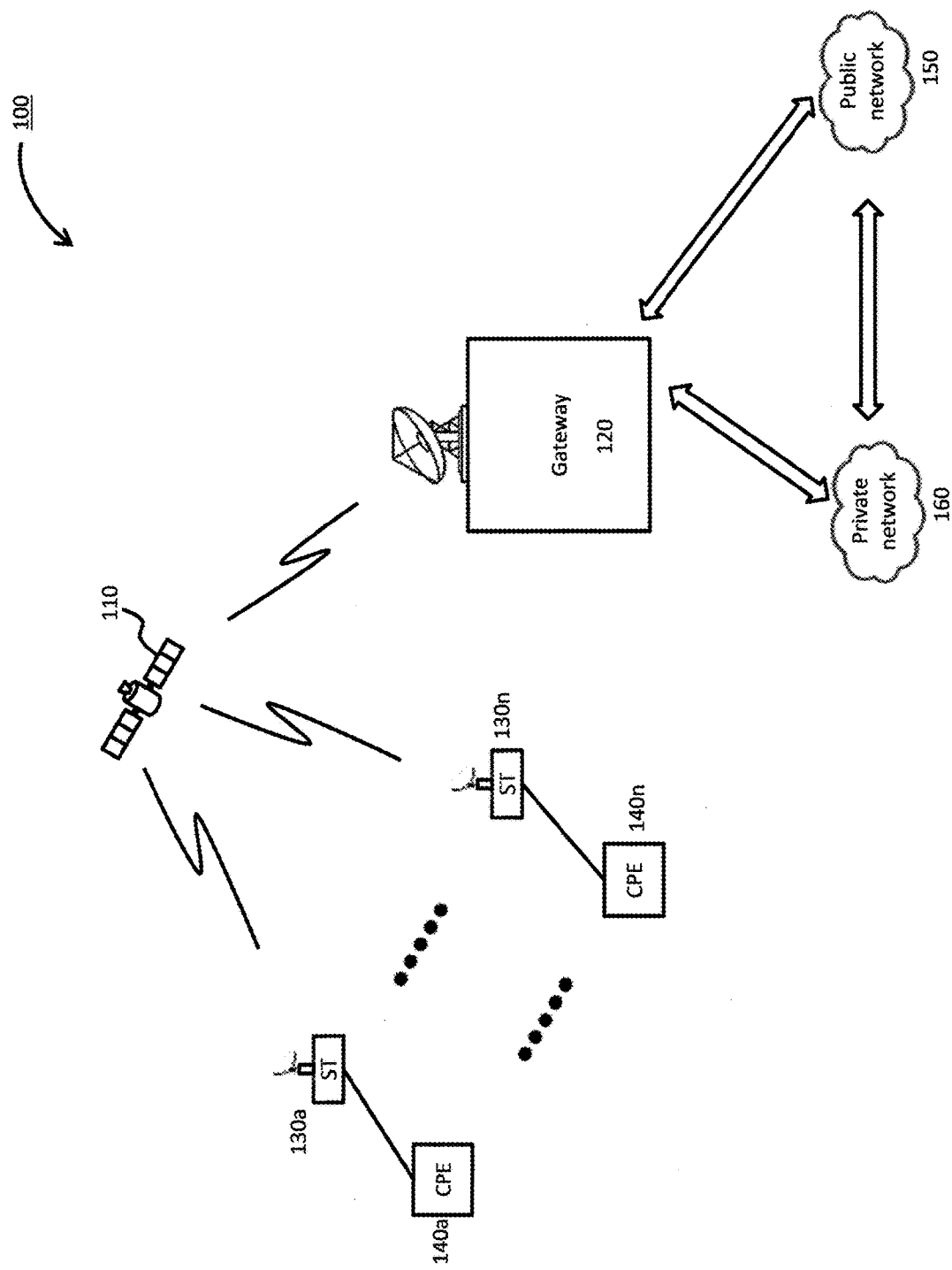
FIG. 1 is a diagram of a system capable of providing of voice and data services, according to at least one embodiment.

FIG. 1 illustrates an exemplary satellite communication system 100 capable of providing voice and data services. The communication system 100 includes a satellite 110 that supports communications among a number of gateways 120 (only one shown) and multiple satellite terminals (STs) 130a-130n. Each satellite terminal (or terminal) 130 can be configured for relaying traffic between its customer premise equipment (CPEs) 140a-140n, a public network 150 such as the Internet, and/or its private network 160. The gateway 120 can be configured to route this traffic across the public network 150 and private network 160 as appropriate. The gateway 120 can be further configured to route traffic from the public 150 Internet and private network 160 across the satellite link to the appropriate terminal 130. The terminal 130 then routes the traffic to the appropriate customer premise equipment (CPE) 140.

As illustrated in FIG. 1, the satellite communication system 100 facilitates communication between a satellite network, public networks 150, and private networks 160. Various embodiments, however, can also be configured for providing communication within only a terrestrial network (e.g., public communication networks 150 and private communication networks 160), or within only a satellite network. Thus, while FIG. 1 only illustrates components such as the terminals 130 and gateway 120, other network components such as, for example, a VPN router and a VPN gateway can be provided in place of, or in addition to, the illustrated terminal 130 and gateway 120. Furthermore, various embodiments can be incorporated within a router having QoS capabilities. Accordingly, the communication system 100 illustrated in FIG. 1 is only intended to be illustrative, and in no way restrictive.

Figure 2:
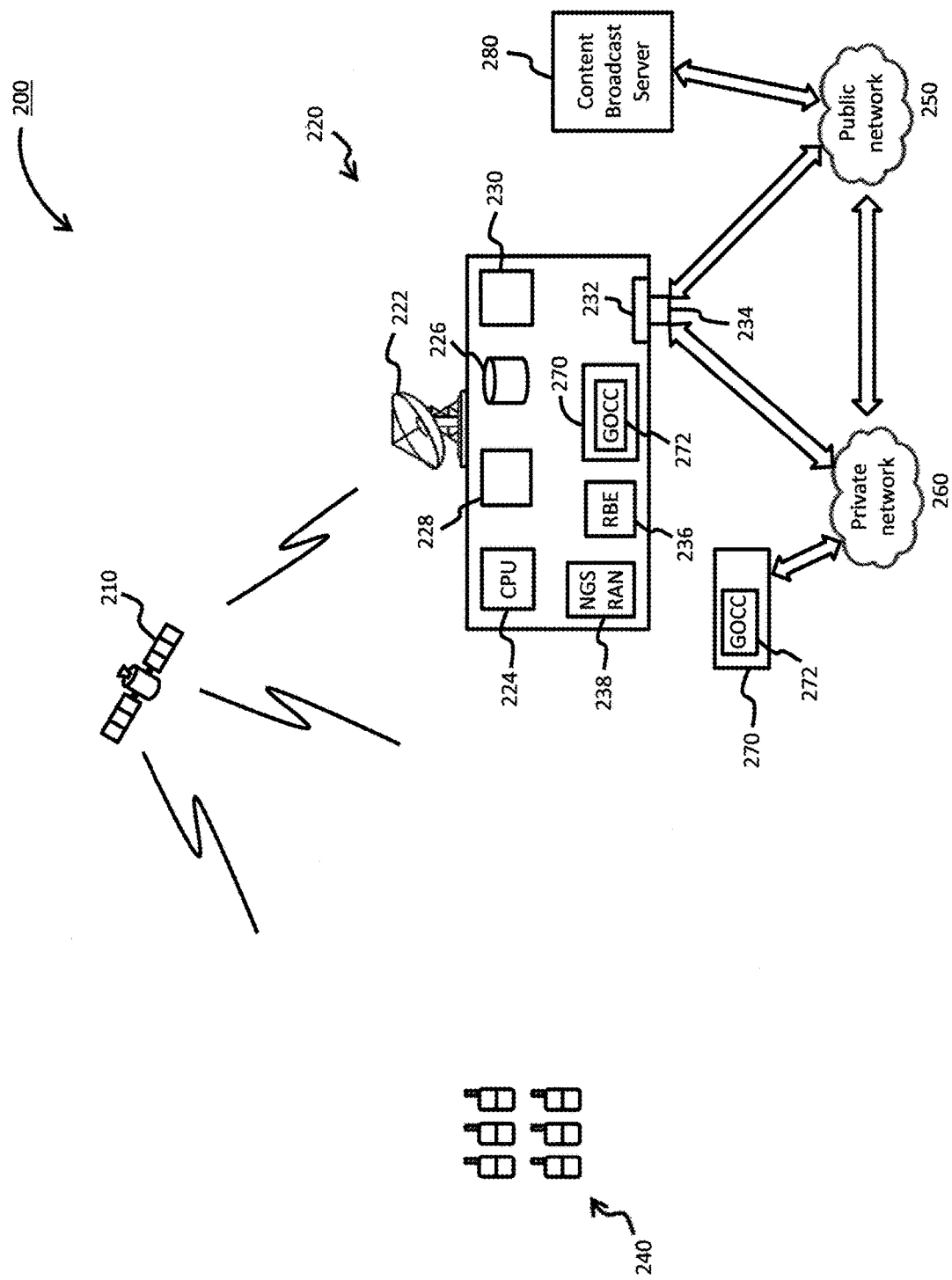
FIG. 2 is a diagram of a system capable of providing low data rate broadcasts, according to various embodiments.

FIG. 2 illustrates a satellite communication system 200 capable of providing receive-only broadcast services in addition to voice and data services. The satellite communication system 200 includes a satellite 210 that supports communications among a number of gateways 220 (only one shown) and multiple satellite terminals 240a-240n. The satellite communication system 200 can also be configured to include multiple satellites 210 that are orbital and/or geostationary. Furthermore, each gateway 220 can be configured to communicate with a single or multiple satellites 210 depending on the specific system architecture. As previously discussed, each satellite terminal (or terminal) 240 can be configured for relaying traffic between its customer premise equipment (CPEs) (i.e., user equipment), a public network 250 such as the internet, and/or its private network 260. Depending on the specific embodiment, the customer premise equipment can be a desktop computer, laptop, tablet, cell phone, broadcast client, etc. Customer premise equipment can also be in the form of connected appliances that incorporate embedded circuitry for network communication can also be supported by the satellite terminal (or terminal) 240. Connected appliances can include, without limitation, televisions, home assistants, thermostats, refrigerators, ovens, etc. The network of such devices is commonly referred to as the internet of things (IoT).

According to an exemplary embodiment, the terminals 240 can be in the form of mobile devices that are only capable of receiving communication signals (or broadcast content) from the satellite 210, without the ability to transmit signals directly to the satellite 210. Such terminals 240 are also capable of being transported to different locations by a user. The terms user terminal, satellite terminal, and terminal may be used interchangeably herein to identify any device capable of directly communicating with the satellite 210 in a unidirectional or bidirectional. According the disclosed embodiments, the gateway 220 can be configured, in part, to route traffic from the public network 250 and private network 260 across the satellite link to the appropriate terminal 240. The traffic can be received from various entities, such as a content broadcast server. The traffic routed by the gateway 220 can be in the form of broadcast content capable of being received, but not automatically utilized, by any terminal 240 within the satellite coverage beams. In order to utilize the broadcast content, for example, the terminal 240 must receive appropriate authorization so that the broadcast content can be decoded and/or decrypted. According to at least one embodiment, the terminal 240 is capable of routing the broadcast content to the appropriate customer premise equipment (e.g., 140), such as a broadcast client. According to other embodiments, the terminal 240 can include internal broadcast clients implemented using software and/or hardware.

According to at least one embodiment, the gateway 220 can include various components, implemented in hardware, software, or a combination thereof, to facilitate communication between the terminals 240 and external networks 250, 260 via the satellite 210. According to an embodiment, the gateway 220 can include a radio frequency transceiver 222 (RFT), a processing unit 224 (or computer, CPU, etc.), and a data storage unit 226 (or storage unit). While generically illustrated, the processing unit 224 can encompass various configurations including, without limitations, a personal computer, laptop, server, etc. As used herein, a transceiver corresponds to any type of antenna unit used to transmit and receive signals, a transmitter, a receiver, etc. The RFT 222 is useable to transmit and receive signals within a communication system such as the satellite communication system 200 illustrated in FIG. 2. According to various embodiments, the gateway 220 can include multiple RFTs 222 for communicating with multiple satellites 210. The data storage unit 226 can be used, for example, to store and provide access to information pertaining to various operations in the satellite communication system 200. Depending on the specific implementation, the data storage unit 226 (or storage unit) can be configured as a single drive, multiple drives, an array of drives configured to operate as a single drive, etc.

According to other embodiments, the gateway 220 can include multiple processing units 224 and multiple data storage units 226 in order to accommodate the needs of a particular system implementation. Although not illustrated in FIG. 2, the gateway 220 can also include one or more workstations (e.g., computers, laptops, etc.) in place of, or in addition to, the one or more processing units 224. Various embodiments further provide for redundant paths for components of the gateway 220. The redundant paths can be associated with backup components capable of being seamlessly or quickly switched in the event of a failure or critical fault of the primary component.

According to the illustrated embodiment, the gateway 220 includes baseband components 228 which operate to process signals being transmitted to, and received from, the satellite 210. For example, the baseband components 228 can incorporate one or more modulator/demodulator units, system timing equipment, switching devices, etc. The modulator/demodulator units can be used to generate carriers that are transmitted into each spot beam and to process signals received from the terminals 240. The system timing equipment can be used to distribute timing information for synchronizing transmissions from the terminals 240.

According to an embodiment, a fault management unit 230 can be included in the gateway 220 to monitor activities and output one or more alerts in the event of a malfunction in any of the gateway components. The fault management unit 230 can include, for example, one or more sensors and interfaces that connect to different components of the gateway 220. The fault management unit 230 can also be configured to output alerts based on instructions received from a remotely located, or co-located, network management system 270 (NMS). The NMS 270 maintains, in part, information (configuration, processing, management, etc.) for the gateway 220, and all terminals 240 and beams supported by the gateway 220. According various embodiments, the NMS 270 includes a ground operations control center (GOCC) 272 which manages information specific to the broadcast content. Depending on the specific implementation, the GOCC 272 can be located outside the NMS 270. For example, the GOCC 272 can be configured as an independent component within the gateway 220. The GOCC 272 can also be located outside the gateway 220 and configured to establish communication over public networks 250 or private networks 260. The gateway 220 can further include a network interface 232, such as one or more edge routers, for establishing connections with a terrestrial connection point 234 from a service provider. Depending on the specific implementation, however, multiple terrestrial connection points 234 may be utilized.

As illustrated in FIG. 2, the gateway 220 further includes a radio access network (RAN) 236 and a RAN broadcast entity 238 (or RBE). As discussed in greater with respect to FIG. 3, the RAN 236 and RBE 238 include various networking layers as well as modified components configured to specifically optimize unidirectional transmission of broadcast content. The RAN 236 and RBE 238 include appropriate hardware and software to manage and coordinate communication between external networks and the satellite network. For example, the RAN 236 and RBE 238 can facilitate management of broadcast content received from content broadcast servers 280 over a public network 250, and delivery of such content to the terminals 240. Although FIG. 2 only illustrates one content broadcast server 280, it should be noted that various implementations can incorporate multiple content broadcast servers 280. For example, each content broadcast server 280 can supply different types of broadcast content such as, but not limited to, traffic, weather, emergency warnings, national advisories, etc. The broadcast content can also be tailored to specific geographical regions, cities, etc. Alternatively, a single content broadcast server 280 can be used to supply all the different types of broadcast content. According to such implementations, each type of broadcast content can be associated with unique port numbers from the content broadcast server 280.

Figure 3:
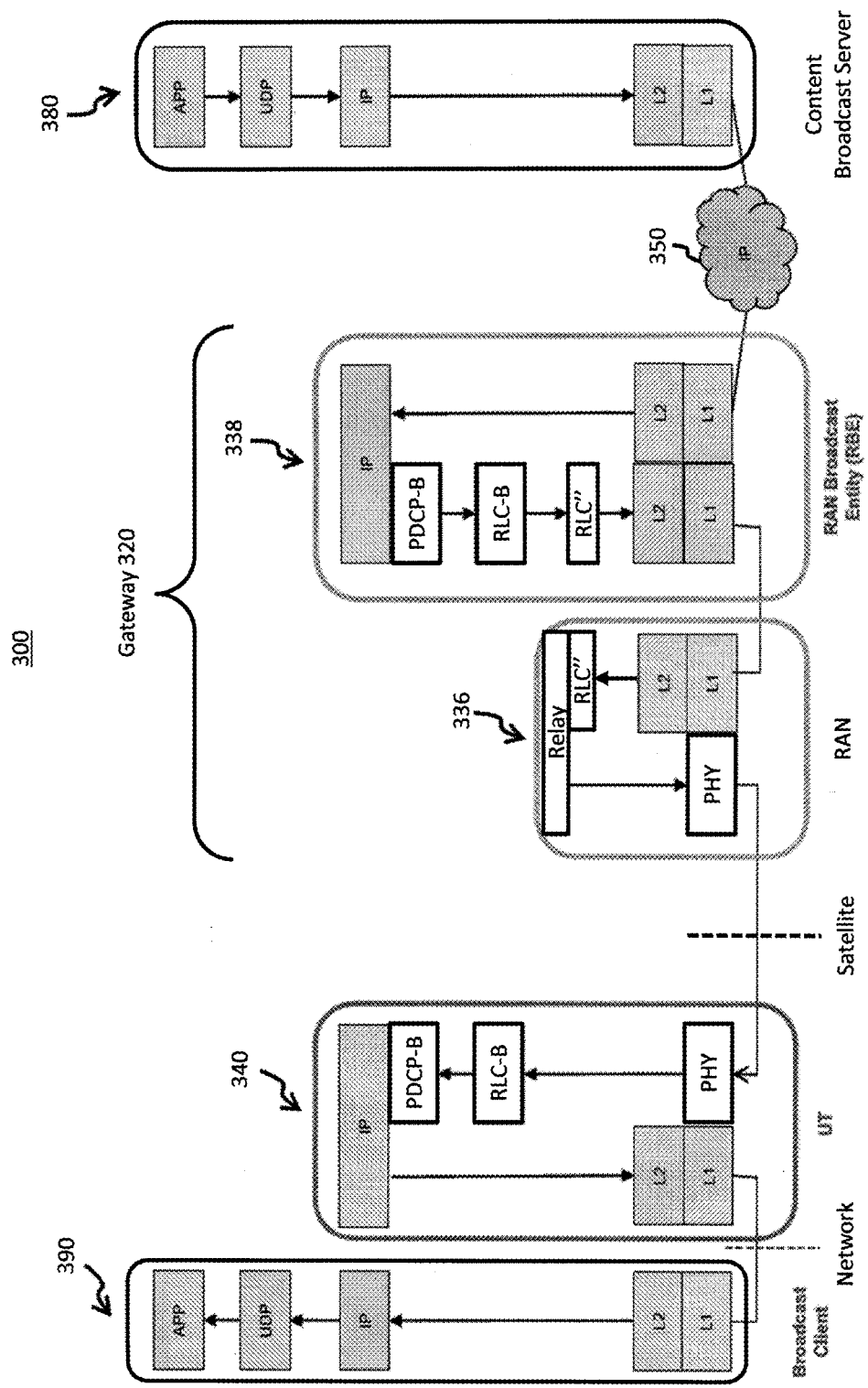
FIG. 3 is a diagram of an end-to-end protocol architecture, according to one embodiment.

FIG. 3 illustrates an end-to-end protocol architecture of a system 300 for implementing broadcast services according to one or more embodiments. The broadcast services can be implemented on the satellite communication system illustrated in FIG. 2 in addition to conventional bidirectional voice and data services. As illustrated in FIG. 3, the system 300 includes one or more content broadcast servers 380 (only one shown), an RBE 336, a RAN 338, a terminal 340 (or user terminal), and one or more broadcast clients 390 (only one shown). The content broadcast server 380 implements a conventional layer architecture which allows broadcast content from upper layers, such as an application (APP) layer to be transmitted over a public network over a wired and/or wireless physical connection.

According to at least one embodiment, the content broadcast server 380 can be configured to supply different types of broadcast content (e.g., traffic, weather, emergency warnings, national advisories, etc.). Each type of broadcast content can be assigned to a unique port number for transmission. The type of broadcast content carried by IP packets over the public network 350 can be identified based on the socket address (i.e., source IP address+port number). It should be noted that a source IP address range and/or a port range can be utilized instead of a single source IP address and port number. For example, the types of broadcast content can be assigned to different ports as follows: traffic=port 10, weather=port 20, and emergency warnings=port 30. All broadcast content received from the content broadcast server 380 would share the same source IP address. However, the port numbers would differ based on the type of broadcast content being transmitted. Traffic broadcast content would be identified as 192.168.70.125:10 using IPv4 notation. If IPv6 notation is used, however, then the format of the source IP address would be different. Weather broadcast content would be identified as 192.168.70.125:20, and emergency broadcast content would be identified as 192.168.70.125:30. According to other embodiments, a separate content broadcast server 380 can be utilized to supply each type of broadcast content. Since IP packets originating from each content broadcast server 380 would have a unique source address, the type of broadcast content would be identifiable using the source address alone. According to further embodiments, the system 300 can incorporate a combination of both content broadcast server 380 capable of supplying multiple types of broadcast content and content broadcast servers 380 that only supply a single type of broadcast content.

The RBE 336 also implements a conventional layer architecture which allows broadcast content received from the content broadcast server 380 to be transmitted over a local wired and/or wireless connection to other components within the gateway 320, such as the RAN 338. According to one or more embodiments, the RBE 338 includes customized layer implementations that are configured for unidirectional broadcast. In contrast, conventional systems incorporate a radio link control (RLC) layer and a packet data convergence protocol (PDCP) layer that operate in bidirectional format. This is necessary, in part, due to the fact that many operations require bidirectional handshakes and transmission of acknowledgment messages between the different entities. Since the system 300 is configured to unidirectional broadcast services, the RBE 336 includes an RLC-B layer and an RLC" layer, as well as a PDCP-B layer. Data packets received from the content broadcast server 380 are processed by the PDCP-B layer in a manner that optimizes the added PDCP header for unidirectional service, for example, by omitting content such as sequence numbers required in bidirectional communication.

According to the embodiment illustrated in FIG. 3, the RAN 338 implements the physical waveform used to transmit the broadcast content over the satellite network. The RAN 338 also includes a peer entity for the RLC" layer of the RBE 336. Data packets from the RBE 336 are supplied to the RAN 338, where they are processed for transmission over the satellite network. The terminal 340 also implements a conventional layer architecture which allows data packets received from the RAN 338 to be processed in order to supply the broadcast content to upper layers and appropriate broadcast clients 390. Depending on the specific implementation, the broadcast content can be supplied to external broadcast clients 390 (only one shown) over a wired and/or wireless connection. The broadcast content can also be supplied to upper layer applications within the terminal 340. The terminal 340 also implements peer entity layers for the PDCP-B and RLC-B layers of RBE 336.

The PDCP-B layer of the RBE 336 is also configured to compress data packets received from the content broadcast server 380. According to various embodiments, the PDCP-B layer implements a dictionary type compression technique to reduce the size of received data packets. For example, a compression dictionary containing a predetermined number of words (or entries) can be stored in the RBE 336 using an index format. Each word (or entry) could therefore be accessed using its index. The dictionary can contain any number of entries, based on the frequency at which they are used. For example, the dictionary can contain entries that are used 70%, 80%, 85%, 90%, etc. of the time. The dictionary can also be stored in each terminal 340 during an initialization phase or production. Consider a case where the dictionary entries correspond to words in the English language that are used 80% of the time, and amount to a count of 100 k words. It should be noted that this number of entries (100 k) is only selected for ease of describing various features and not intended to be an accurate representation of the usage of these words. Transmitting the word "compression" would typically require representation of each letter using a 7-bit ASCII character. Thus, transmission would require 77 bits for the 11 letters. By utilizing the dictionary, however, only the index value for this word would be transmitted instead of the actual 11 letters. For example, if "compression" is the $700^{th}$ entry in the dictionary, the number "700" would be transmitted, and the terminal 340 would access the $700^{th}$ entry and retrieve the word "compression". A maximum of 17 bits ($2^{17}$=131,072) would be required to access any entry in the dictionary.

According to the disclosed embodiments, the unidirectional nature of the system 300 does not provide an ability to update the library when encountering words that do not exist in the dictionary. In bidirectional systems, words that do not exist in the dictionary can be transmitted as ASCII characters and subsequently added to the dictionary. The receiver would also add the word to its existing dictionary and transmit an acknowledgement signal to indicate that the new word can be accessed using its index in the future. Since the system 300 is unidirectional, if new words are added by the RBE 238 and the terminals 340, it is not possible to provide confirmation that a new word was successfully received and/or added to the terminal's dictionary. Over time, this can result in an increasing number of errors as the dictionaries become out of sync. According to one or more embodiments, the RBE 238 and terminals 340 can periodically reset (or return) to the initial dictionary so that they may once again be synchronized. The dictionaries can be reset, for example, at fixed intervals (1 hr., 2 hr., 3 hr., etc.) or fixed times (e.g., 06:00 hr., 12:00 hr., 18:00 hr., etc.). A common system clock, or GPS clock, can be used for determining when the dictionaries should be reset in order to avoid discrepancies between internal device clocks.

The RLC-B and RLC" are configured to perform segmentation and reassembly of data packets prior to transmission over the satellite network. According to one or more embodiments, the RBE 336 configures the data packets for transmission over supported Walsh channels (or Walsh codes). As described in further detail below, the disclosed embodiments utilize the lowest level of Walsh codes which correspond to the lowest transmission rates, but are able to achieve higher transmission rates through aggregation. It should be noted that other methods of channel selection can be utilized instead of Walsh Codes. For example, various embodiments can incorporate frequency division multiplexing and/or time division multiplexing techniques, instead of Walsh codes, for frequency assignment, and identify specific broadcast channels using time-slots. The RBE 336 is configured to segment the data packets into multiple RLC blocks that they can be carried on multiple physical layer bursts. For example, if the lowest level Walsh channel supports a transmission of 4.8 Kbps and a burst is transmitted every 20 msec, then 96 bits can be carried on each burst. Since the data packets are in the form of IP packets that can contain over 1k bytes, they must be segmented to fit on multiple bursts.

According to at least one embodiment, the RLC-B header is optimized for unidirectional operation by omitting unnecessary fields such as sequence numbers that are used, in part, to request retransmission of segments. This can result in a significant reduction in size for the RLC-B header (1-2 bytes) compared to a traditional RLC header (6-8 bytes). According to an embodiment, the RLC-B header includes a 1-bit field to indicate the first segment (or RLC block) of a data packet (or IP packet) and a 1-bit field to indicate the last segment (or RLC block) of the data packet. When the data packets are received by the terminal 340, they are in the form of RLC blocks that must be reassembled by the peer RLC-B layer to recover the original data packet. According to one or more embodiment, the terminal 340 assembles all RLC blocks between the ones identified as first and last into a data packet, and supplies the data packet to the upper layers.

Figure 4:
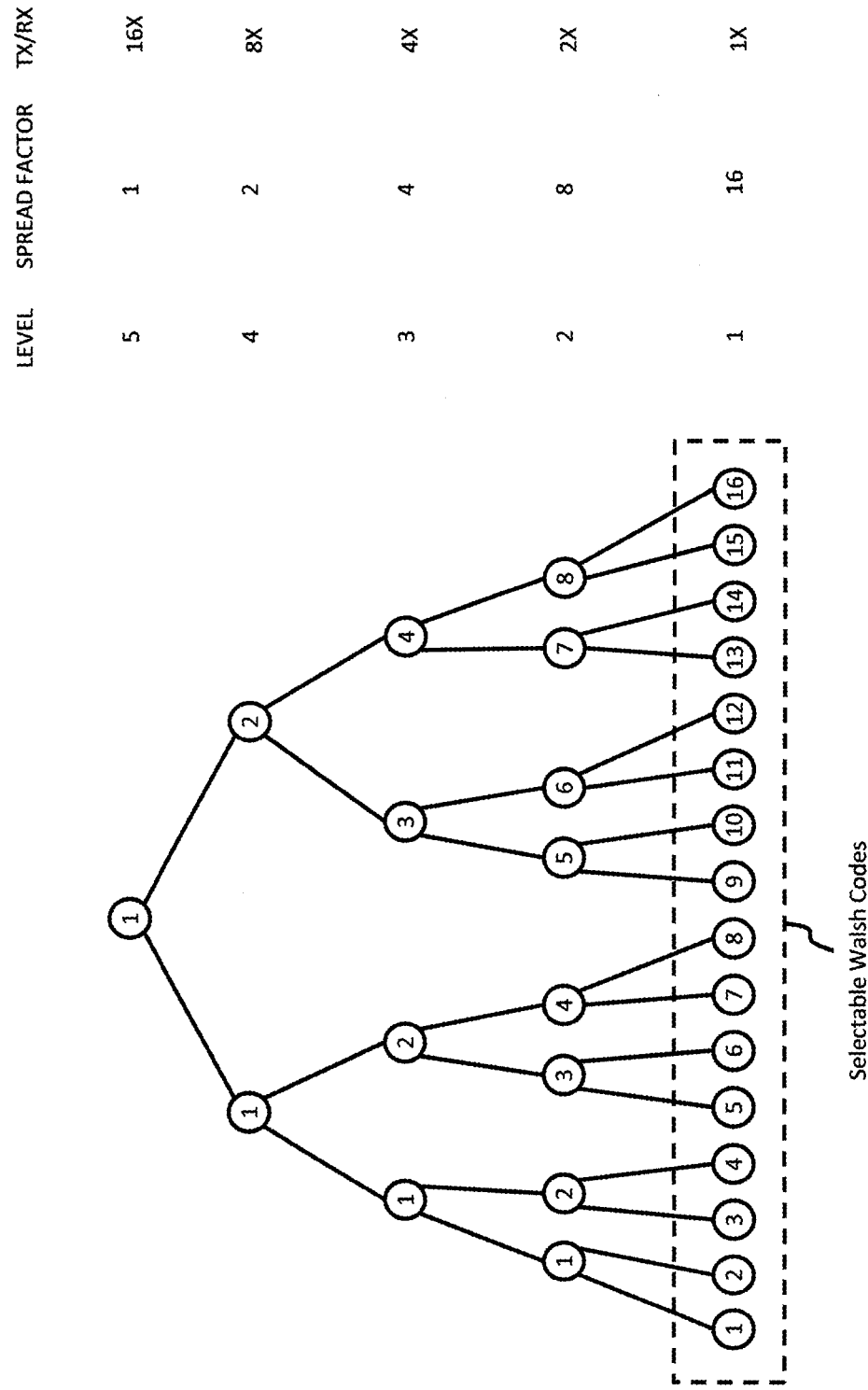
FIG. 4 is a diagram of a Walsh code tree.

FIG. 4 illustrates an exemplary tree structure of assignable Walsh codes. The tree structure includes 5 different levels. The top level (level 5) corresponds to a single spread factor of 1, which also corresponds to the number of nodes for the level. Each node represents a Walsh code (used interchangeably with Walsh channel) for defining a communication channel. Two branches extend from the top level to define level 4, which has a spread factor of 2. Two branches extend from each node in level 4 to define level 3, which has a spread factor of 4. Two branches extend from each node in level 3 to define level 2, which has a spread factor of 8. Level 1 is defined by two branches which extend from each node in level 2, and has a spread factor of 16. As illustrated in FIG. 4, each level supports transmission at different rates. Furthermore, a different physical waveform is required for transmission at each level. If a terminal 340 operating using a Walsh channel corresponding to level 2, node 5, for example, is reassigned to a Walsh channel corresponding to level 1, node 7, a different physical waveform is required, and time is required for the terminal 340 must resynchronize with the new waveform.

According to the disclosed embodiments, only Walsh codes from level 1 are assigned for transmitting broadcast content. These Walsh codes represent channels having the lowest transmission rate. According to other embodiments (e.g., frequency division multiplexing, time division multiplexing, etc.), time slots representing channels having the lowest transmission rate would be assigned for transmitting broadcast content. In order to achieve a higher transmission rate, multiple Walsh codes can be aggregated and assigned for transmitting broadcast content. For example, if the lowest broadcast rate is 4.8 Kbps, then code 3 can be assigned for transmitting broadcast content at 4.8 Kbps. The rate can be increased to 9.6 Kbps by further assigning code 5 for transmitting the broadcast content and aggregating the two channels using these Walsh codes. Similarly, the rate can be increased to 14.4 Kbps by additionally assigning code 9 for transmitting the broadcast content. Further increases can be achieved by assigning additional codes. Conversely, the rate can be decreased by removing one or more codes, i.e., code 9 and/or code 5. Such increases and decreases in transmission rate can be determined based, at least in part, on overall bandwidth usage in the satellite network, priority of the broadcast content, etc. According to such embodiments, it is not necessary to move up to a higher level of the code tree (or other channel assignment method), which would require a different physical waveform and synchronization delays. Furthermore, the codes selected for aggregation do not need to be in pairs that share a common node at the next upper level.

According to one or more embodiments, Walsh codes can be dynamically allocated based on different conditions and/or discretion of the service provider. The BCCH can be used to indicate when Walsh codes are introduced for a new type of broadcast content, added/removed for an existing type of broadcast content, cancelled for an inactive type of broadcast content, etc. For example, if emergency warnings are not generated over an extended period of time, the service provider may reassign the Walsh channel assigned for this type of broadcast content for other network traffic. If a situation occurs where an emergency warning is suddenly necessary, a Walsh channel can be assigned to this type of broadcast content and transmitted over the BCCH. Terminals 340 monitoring the BCCH would receive this information and tune in to the newly assigned Walsh channel. The service provider can also reassign the Walsh channel and transmit the new assignment over the BCCH. Terminals 340 that were previously receiving the emergency warnings will also receive this information and conclude that the emergency warnings are no longer being broadcast.

As previously discussed, the RBE 336 is configured to segment data packets so that they can be carried on the physical bursts transmitted by RAN 338. When a single Walsh channel is used to supply the broadcast content, the segments are expected to be transmitted and received sequentially. If multiple Walsh channels are aggregated, however, different segments may be transmitted on different channels. According to the disclosed embodiments, a broadcast control channel (BCCH) is used to transmit a list of Walsh code assignments. The RLC" layer is configured to designate which segment should be transmitted on the assigned Walsh codes. If two Walsh codes are used, for example, the RLC" layer designates which segment should go on the first Walsh code and which segment should go on the second Walsh code. The terminal 340 receiving the broadcast content also monitors the BCCH to determine the sequence of Walsh code assignments. During reassembly, the segments are arranged in the same order in which the Walsh codes are assigned for the broadcast content. For example, if two Walsh codes are assigned, then segments received on the first assigned Walsh code would carry earlier data, while segments received on the second assigned Walsh code would carry later data.

According to various embodiments, multiple types of broadcast content can be transmitted within individual satellite beam by assigning different Walsh channels to each type of broadcast content. For example channel 1 can be assigned to local weather, channel 2 can be assigned to local traffic, and channel 3 can be assigned to emergency warnings. All three channels can be transmitted within a single beam that covers the appropriate geographical area. Another beam covering a different geographical area can carry the same three channels, but with broadcast content specific to its geographical coverage. Furthermore, depending on the specific implementation, the satellite network may utilize a plurality of satellites (i.e., a constellation of LEO satellites), with multiple satellites having coverage beams that overlap the same area. In such implementations, the gateway 320 can supply the same broadcast content via the overlapping satellites so that the terminal 340 can receive the broadcast content from whichever satellite is visible. The specific type of broadcast content can be identified based, in part, on information associated with the content broadcast server 380. For example, if different content broadcast servers 380 are used, then the source IP address of data packets can be used to identify each type of broadcast content. If a single broadcast content server 380 is used, then each type of broadcast content can be transmitted using a unique port number or port range. The specific type of broadcast would then be identified using both the source IP address (or address range) and port number (or port range) of received data packets. The terminal 340 can subsequently supply the broadcast content to external broadcast clients 390 or internal broadcast clients such as applications (e.g., navigation, traffic, weather, etc.).

According to at least one embodiment, the network operator can establish a conditional access system for allowing consumers to utilize the different types of broadcast content. The terminals 340 can be configured to incorporate hardware and/or software components that are controlled exclusively by the network operator. Users authorized to receive the one or more types of broadcast content can receive specialized hardware, such as a smart card, that must be interfaced with the terminal 340. Control signals may also be supplied to the terminals 340 in order to provide authorization for utilizing the broadcast content. For example, all terminals may be capable of receiving signals containing the broadcast content, but only authorized terminals 340 would be able to decode such signals. The terminals 340 can be initialized with a predetermined number of scrambling codes that can only be accessed when authorized by the network operator. The scrambling codes can be stored, for example, in a non-volatile memory of the terminal 340. Once a particular user meets the necessary authorization criteria, the control signal can be transmitted to the terminal 340 in order to provide access to the scrambling codes. Depending on the specific implementation, the BCCH can also transmit information to identify an index and time when each scrambling code should be used by the terminal 340.

The system 300 illustrated in FIG. 3 can also be configured to implement a symmetric encryption algorithm, such as Advanced Encryption Standard (AES) 128, but without the need for conventional bidirectional key exchanges. For example, each terminal 340 can be initialized with a set of predefined keys stored in non-volatile memory. The encryption can be applied to compressed RLC blocks generated by the RLC-B layer of the RAN 338 via segmentation. BCCH can transmit an index to the specific encryption key that should be used with each frame number. Upon receiving the index, the terminal 340 would apply the appropriate encryption key to decrypt the data. According to at least one embodiment, the system 300 can be configured to dynamically generate new encryption keys based, in part, on the existing set of predefined keys. For example, a key generating algorithm can be stored in the terminal 340 during initialization. When a new encryption key is desired, the gateway 320 can select one or more existing encryption keys, and apply the key generating algorithm to obtain a new encryption key. Each index corresponding to the selected encryption keys would then be transmitted to the terminal 340 with an indication that the key generating algorithm should be applied. The terminal 340 would then retrieve the corresponding encryption keys and apply the key generating algorithm to obtain the identical encryption key used by the gateway 320. According to various embodiments, the terminal 340 can be configured to apply the key generating algorithm anytime multiple keys are received. Such features can eliminate the need to explicitly indicate that the key generating algorithm should be applied.

Figure 5:
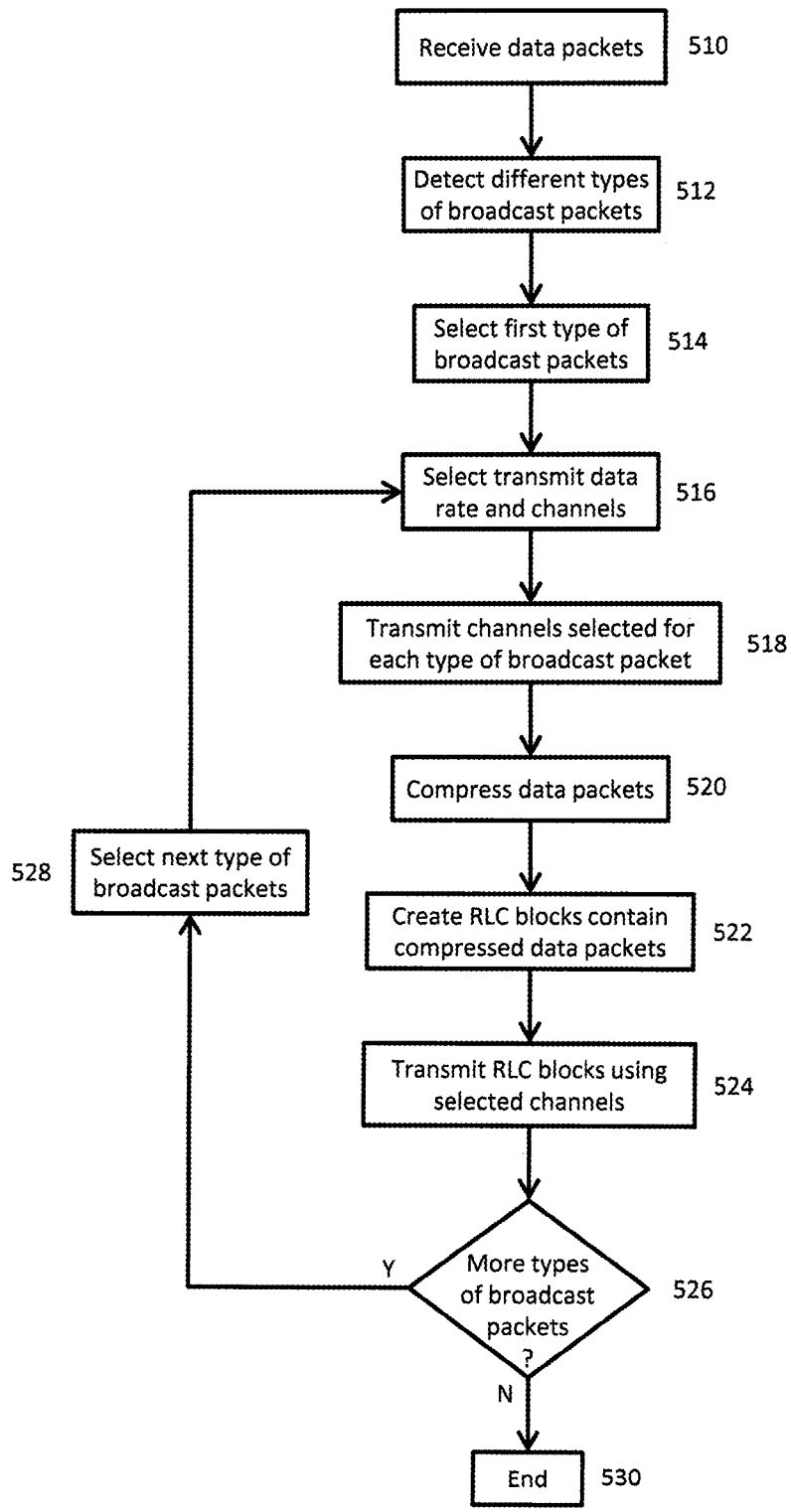
FIG. 5 is a flowchart of a process for providing low data rate broadcasts, according to various embodiments.

FIG. 5 illustrates steps performed in providing broadcast content in accordance with one or more embodiments. At 510, data packets are received from an external network. The data packets can be received, for example, from a content broadcast server over a public network. Depending on the specific implementation, the data packets can also be received from multiple content broadcast providers. The data packets can also be in the form of IP packets, UDP packets, or both. At 512, different types of broadcast packets are detected. For example, the data packets received can be examined in order to detect whether they correspond to different types of broadcast packets. Such determinations can be made by examining one or more fields in the header of each data packet to identify information such as a source address (or range) and/or port number (or range).

According to various embodiments, each type of broadcast packet can contain a different type of broadcast content. For example, one type of broadcast packet can constitute broadcast content pertaining to local weather local weather information, another type of broadcast packet can constitute broadcast content pertaining to local traffic conditions, etc. The number of broadcast packet types that can be detected can vary depending on the specific implementation, geographical area, etc. For example, one satellite coverage beam may be configured to transmit local traffic information and emergency warnings, such as flooding, if its coverage area includes flood prone regions. Such emergency warnings may be omitted from coverage beams which overlap draught prone areas. Coverage beams which overlap may carry some of the same broadcast content in order to provide redundancy for customers within or near the overlapping regions.

At 514, the first type of broadcast packets is selected. For example, if the received data packets include two types of broadcast packets (e.g., local weather and to local traffic), then the broadcast packets pertaining to local weather can be selected as the first type of broadcast traffic (or vice versa). At 516, a transmit data rate is selected for supplying the received broadcast packets over a satellite network. In addition, channels are also selected for achieving the desired transmit data rate. According to various embodiments, Walsh codes can also be used for channel assignment. The transmit data rate and assignments can be selected, for example, by the gateway (or components residing therein). As previously discussed, each Walsh code is synonymous with the channel (i.e., Walsh channel) utilized for transmitting data at a predetermined rate in the satellite network. Alternatively, the channels may be assigned using different methodologies (e.g., frequency division multiplexing, time division multiplexing, etc.). According to various embodiments, each Walsh code is selected from the lowest level of a code tree and has the highest spread factor in the code tree. Accordingly, the selected Walsh codes only facilitate transmission at the lowest data transmit rate supported by the code tree. As previously discussed, if the specific transmit data rate selected at 516 is greater than that achievable by a single Walsh code, then additional Walsh codes may be utilized.

At 518, the channel (or Walsh) codes selected for the first type of broadcast packets are transmitted by the gateway over a broadcast control channel. Thus, all terminals within the coverage area can receive information pertaining to which channels should be monitored in order to receive broadcast content carried on the first type of broadcast packets. At 520, received data packets that correspond to the first type of broadcast packets are compressed. At 522, RLC blocks containing the compressed data packets are created. According to one or more embodiments, the RLC blocks can be created based on the number of Walsh codes selected (or channels selected using other methodologies). At 524, the RLC blocks are transmitted over the satellite network using the channels (or Walsh codes) selected for the first type of broadcast packets.

At 526, it is determined whether additional types of broadcast packets were also detected from the received data packets. If additional types of broadcast packets were received, then the next one is selected at 528. In accordance with the previous example, if the first type of broadcast packets contained broadcast content pertaining to local weather, then the next type of broadcast packets would correspond to those containing broadcast content for local traffic. Control then returns the 516 where the process is repeated for the second type of broadcast packets. If it is again determined (at 526) that additional types of broadcast packets remain, then the next (e.g., third) type of broadcast packets would be selected, and control would pass to 516. If it is determined, at 526, that additional types of broadcast packets are not available, then the process ends at 530. While FIG. 5 illustrates each type of broadcast packet being selected sequentially and processed, it should be noted that such illustration is merely provided for explaining various features. The disclosed embodiments facilitate real time processing of all types of broadcast packets as they are received. In other words, each type of broadcast packet detected can be simultaneously processed. Thus, the steps illustrated in FIG. 5 should be considered illustrative, and not limiting.

Figure 6:
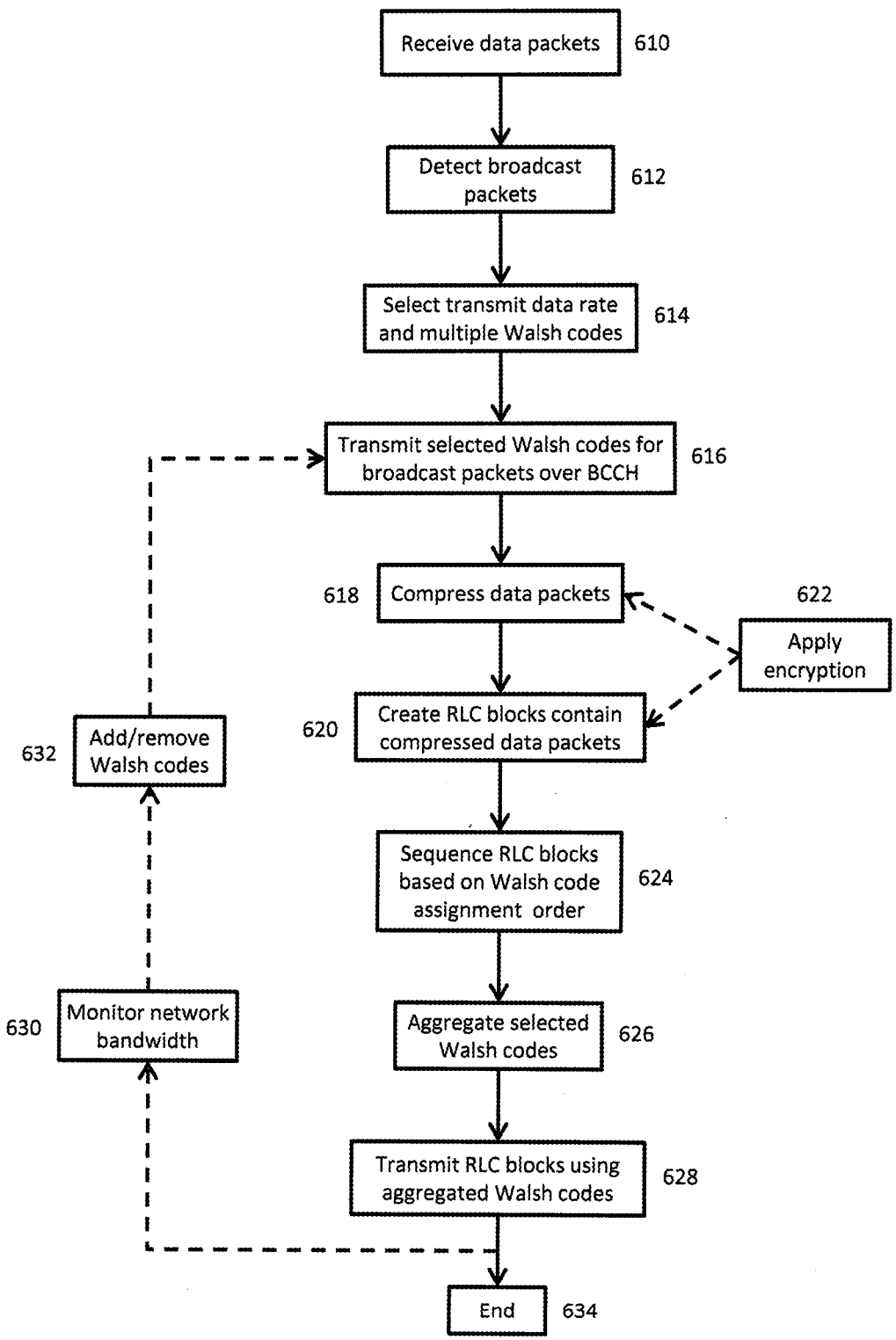
FIG. 6 is a flowchart of a process providing low data rate broadcasts, according to one or more embodiments.

FIG. 6 illustrates steps performed to provide broadcast content, according to various embodiments. At 610, data packets are received from an external network. As previously discussed, the data packets can be received from a content broadcast server remotely located from the gateway. At 612, broadcast packets are detected from the received data packets. According to the illustrated embodiment, the broadcast packets detected can be of a specific type which corresponds to broadcast content received from a content broadcast server that is configured to supply only one type of broadcast content. At 614, a transmit data rate is selected for the broadcast packets. According to the illustrated embodiment, the selected transmit data rate corresponds to a rate which is higher than the data rate supported by individual Walsh codes. Accordingly, multiple Walsh codes are assigned so that the selected transmit data rate can be achieved. At 616, the Walsh codes selected for the broadcast packets are transmitted over the broadcast control channel so that terminals within the satellite network may tune to the appropriate channel for receiving the broadcast content contained in the broadcast packets.

At 618, the data packets are compressed in order to reduce the amount of information being transmitted. At 620, RLC blocks containing the compressed data packets are created. According to various embodiments, an encryption algorithm can be applied to either the compressed data packets or the RLC blocks created from the compressed data packets. This is illustrated at 622. According to at least one embodiment, the encryption can be a symmetric encryption algorithm such as AES-128. However, the encryption is applied without the use of conventional key exchanges. As previously discussed, multiple Walsh codes were utilized in order to achieve the selected transmit data rate. Accordingly, at 624, the RLC blocks are arranged in a sequence corresponding to the order in which the individual Walsh codes were assigned. For example, when the selected Walsh codes are transmitted over the broadcast control channel, the sequence in which they are assigned can be determined. Thus, the RLC blocks would be arranged in an order corresponding to such assignments. At 626, the selected Walsh codes are aggregated in order to access multiple channels capable of being combined to achieve the selected transmit data rate. At 628, the sequenced RLC blocks are transmitted using the aggregated Walsh codes.

According to one or more embodiments, the amount of bandwidth utilized by the satellite network can be continually monitored, at 630, to determine whether adjustments should be made in order to optimize usage and/or efficiency. For example, if multiple Walsh codes are being utilized to transmit broadcast packets containing low priority broadcast content during a period of heavy system demand, then one or more Walsh codes may be removed and reassigned to carry other network traffic. This is indicated at 632. Similarly, if a single Walsh code is currently being used to transmit the broadcast packets during a period of low system demand, then additional Walsh codes may be assigned to increase the data rate used for transmitting the broadcast packets. The process subsequently ends at 634.

Figure 7:
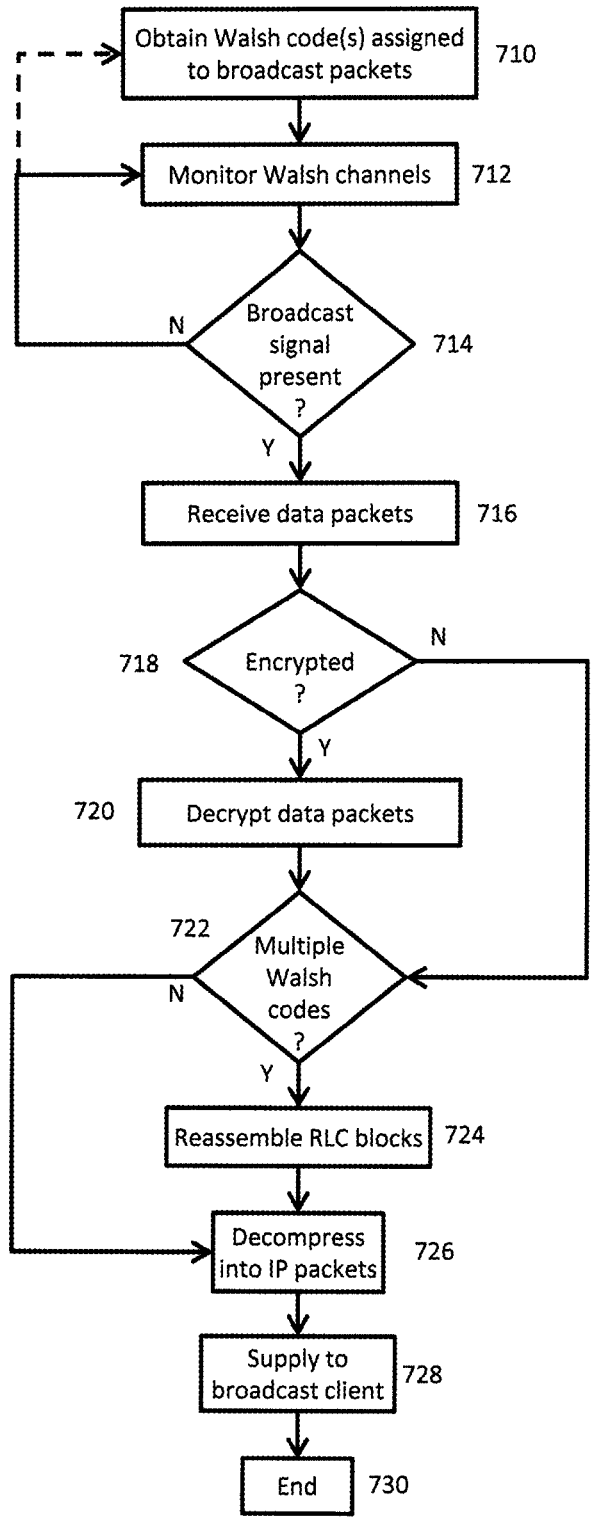
FIG. 7 is a flowchart of a process for receiving low data rate broadcasts, according to one embodiment.

FIG. 7 illustrates a process for receiving broadcast content, according to one or more embodiments. At 710, the Walsh code (or codes) assigned to a type of broadcast packets containing a desired broadcast content are obtained. This can be achieved, for example, by monitoring the broadcast control channel in order to determine which Walsh codes are currently assigned to the particular type of broadcast packets. At 712, the Walsh channels corresponding to the assigned Walsh codes are monitored by the terminal in order to determine when the desired broadcast content is being transmitted. At 714, it is determined whether or not a broadcast signal is actually present within the channel (or channels) being monitored. The broadcast signal can correspond, for example, to transmissions from the gateway. If no broadcast signal is present, control returns to 712 where the terminal continues to monitor the channels. According to at least one embodiment, control can optionally return to 710 in order to determine whether the current Walsh codes are still valid for this type of broadcast packets. If a broadcast signal is detected at 714, then data packets corresponding to the broadcast packets within the signal are received at 716.

At 718, it is determined whether or not the data packets were encrypted. According to the disclosed embodiments, the data packets received from the gateway can be in the form or RLC blocks. If the data packets were encrypted, then the terminal decrypts them at 720. According to one or more embodiments, information such as a key index can be transmitted over the broadcast control channel so that the terminal may retrieve the appropriate encryption key for decrypting the data packets. Control then passes to 722. If the received broadcast packets were not encrypted, control also passes to 722, where it is determined if multiple Walsh codes were used to create the RLC blocks. If multiple Walsh codes were used, then the RLC blocks are reassembled, at 724, based on the order in which the Walsh codes were assigned. If a single Walsh code was utilized, then no reassembly is required and control passes to 726. The reassembled RLC blocks or the individual RLC block is decompressed into one or more IP packets. At 728, the IP packets are supplied to one or more broadcast clients. As previously discussed, the broadcast clients can be in the form of either external devices or applications that are resident on the terminal. The process and at 730.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into the previously described RBE, RAN, broadcast client, terminal, receivers, transmitters, transceivers, gateway, etc. Additionally, such hardware can be interfaced to connect and/or facilitate communication between different components such as the RBE and RAN, or terminal and broadcast client.

Furthermore, various features can be implemented using algorithms illustrated in the form of flowcharts and accompanying descriptions. Some or all steps associated with such flowcharts can be performed in a sequence independent manner, unless otherwise indicated. Those skilled in the art will also understand that features described in connection with one Figure can be combined with features described in connection with another Figure. Such descriptions are only omitted for purposes of avoiding repetitive description of every possible combination of features that can result from the disclosure.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 8:
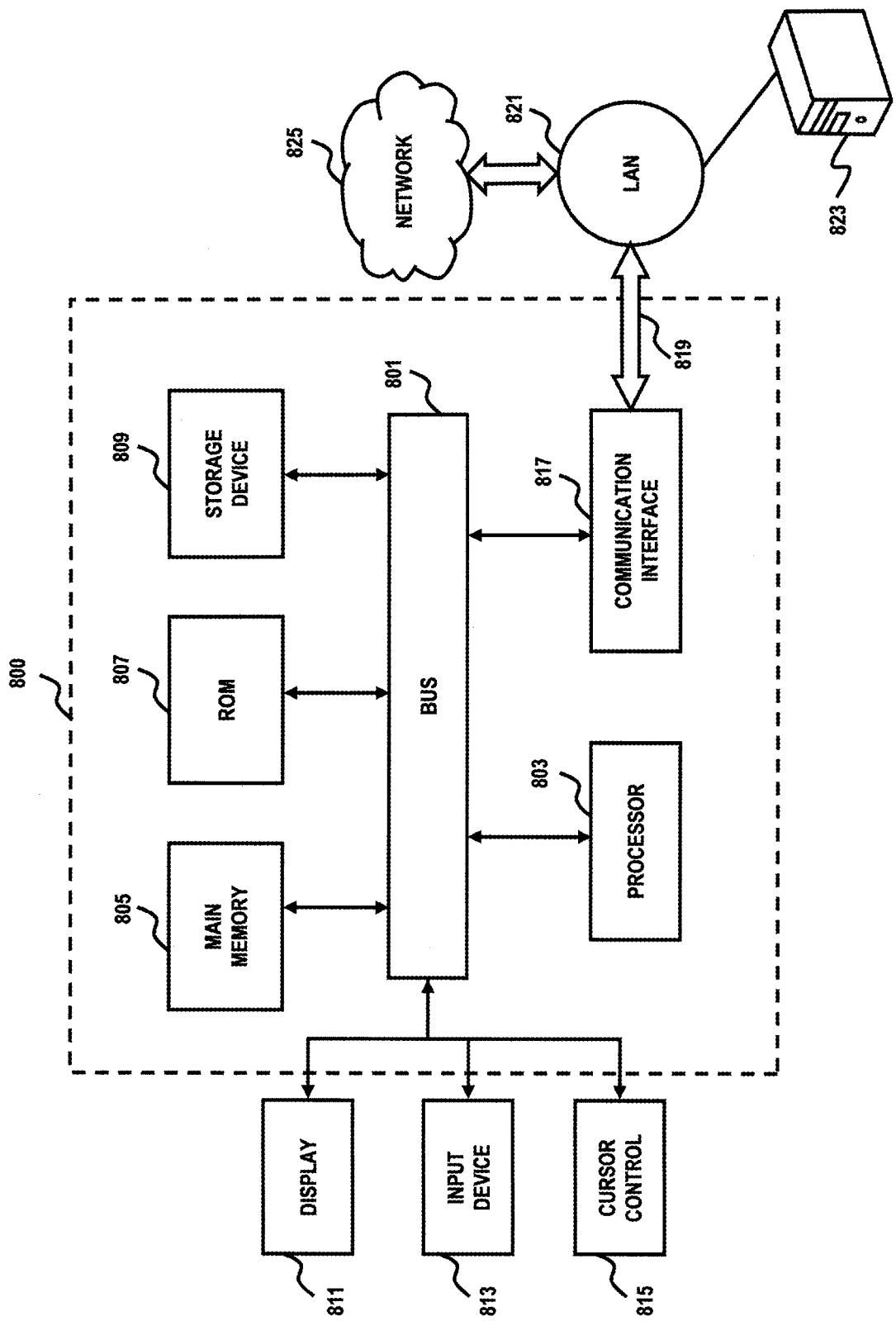
FIG. 8 is a diagram of a computer system that can be used to implement various exemplary features and embodiments.

FIG. 8 is a diagram of a computer system that can be used to implement features of various embodiments. The computer system 800 includes a bus 801 or other communication mechanism for communicating information and a processor 803 coupled to the bus 801 for processing information. The computer system 800 also includes main memory 805, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a light emitting diode (LED) or other flat panel displays, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811. Additionally, the display 811 can be touch enabled (i.e., capacitive or resistive) in order facilitate user input via touch or gestures.

According to an exemplary embodiment, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multiprocessing arrangement may also be employed to execute the instructions contained in main memory 805. In alternative embodiments, hard-wired circuitry may be used in place of or in combination with software instructions to implement exemplary embodiments. Thus, exemplary embodiments are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a High Definition Multimedia Interface (HDMI), etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 such as a wide area network (WAN) or the Internet. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an exemplary embodiment through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Non-volatile media can further include flash drives, USB drives, microSD cards, etc. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 9:
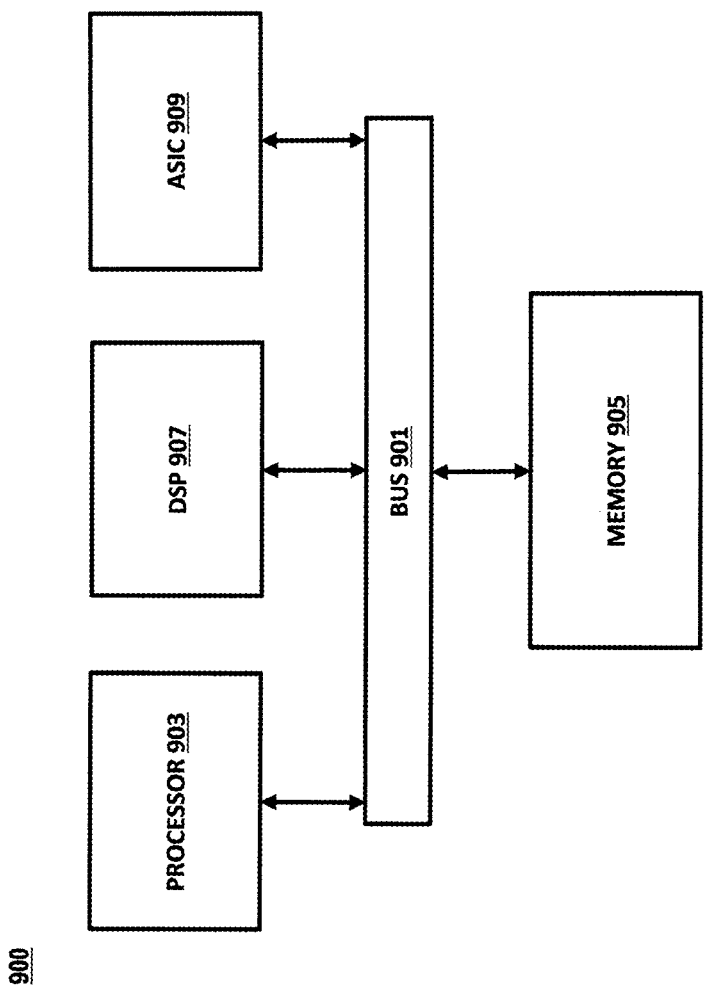
FIG. 9 is a diagram of a chip set that can be used to implement various exemplary features and embodiments.

FIG. 9 illustrates a chip set 900 upon which features of various embodiments may be implemented. Chip set 900 is programmed to implement various features as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of the figures.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein. The memory 905 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
    receiving data packets from an external network;
    detecting at least one type of broadcast packet from the received packet data, each type of broadcast packet containing a different broadcast content;
    selecting, for each type of broadcast packet detected, a transmit data rate and one or more Walsh codes for achieving the transmit data rate, each Walsh code being selected from a lowest level of a code tree and having a highest spread factor in the code tree;
    transmitting the one or more Walsh codes selected for each type of broadcast packet over a broadcast control channel;
    compressing the data packets for each type of broadcast packets;
    creating, for each type of broadcast packet, at least one RLC block containing the corresponding compressed data packets based, at least in part, on the number of Walsh codes selected; and
    transmitting, for each type of broadcast packet, the at least one RLC block from a satellite in a satellite network using the one or more Walsh codes selected for the type of broadcast packet.

2. The method of claim 1, further comprising simultaneously transmitting the at least one RLC block from at least one additional satellite in the satellite network.

3. The method of claim 1, further comprising:
    monitoring bandwidth usage for the satellite network; and
    dynamically increasing or decreasing one or more selected transmit data rates based, at least in part, on the monitored bandwidth usage.

4. The method of claim 1, wherein the compressed data packets for each type of broadcast packet are segmented into a number of RLC blocks corresponding to the number of Walsh codes selected for the respective type of broadcast packet.

5. The method of claim 4, wherein:
    multiple Walsh codes are selected for a particular type of broadcast packet; and
    the number of RLC blocks are sequenced in an order corresponding to an assignment order of each Walsh code for the particular type of broadcast packet.

6. The method of claim 1, wherein the data packets are compressed using a dictionary based compression methodology.

7. The method of claim 6, further comprising:
    selecting a compression dictionary available to terminals in the satellite network; and
    resetting the compression dictionary at predetermined time intervals.

8. The method of claim 1, further comprising encrypting the at least one RLC block.

9. The method of claim 8, further comprising:
    storing a predefined set encryption keys within terminals of the satellite network;
    selecting a particular encryption key from the predefined set of encryption keys for encrypting the at least one RLC block; and
    transmitting an index corresponding to the selected encryption key over the broadcast control channel.

10. The method of claim 9, further comprising:
    selecting multiple encryption keys from the predefined set of encryption keys;
    transmitting an index corresponding to each of the multiple encryption keys;
    creating a new encryption key by applying a key generating algorithm to the multiple encryption keys; and
    encrypting the at least one RLC block using the new encryption key.

11. The method of claim 10, further comprising:
    detecting the one of more Walsh codes for each type of broadcast packet from the broadcast control channel;
    receiving and decoding the transmitted at least one RLC block using the detected one or more Walsh codes;
    decompressing the at least one RLC block into the corresponding at least one type of broadcast packets; and
    supplying each type of broadcast packet to one or more broadcast clients.

12. The method of claim 11, wherein the receiving and decoding further comprises monitoring channels defined by the detected one or more Walsh codes.

13. The method of claim 11, wherein:
    multiple Walsh codes are selected for a particular type of broadcast packet;
    the compressed data packets of the particular type of broadcast packet are segmented into multiple RLC blocks; and
    decompressing the at least one RLC block further comprises reassembling the multiple RLC blocks based on an assignment order of each Walsh code for the particular type of broadcast packet.

14. The method of claim 1, wherein multiple broadcast content can be transmitted within each beam of the satellite.

15. A system comprising:
    a gateway configured to:
        receive data packets from an external network,
        detect at least one type of broadcast packet from the received packet data, each type of broadcast packet containing a different broadcast content,
        select, for each type of broadcast packet detected, a transmit data rate and one or more Walsh codes for achieving the transmit data rate, each Walsh code being selected from a lowest level of a code tree and having a highest spread factor in the code tree, transmit the one or more Walsh codes selected for each type of broadcast packet over a broadcast control channel, compress the data packets for each type of broadcast packets, create, for each type of broadcast packet, at least one RLC block containing the corresponding compressed data packets based, at least in part, on the number of Walsh codes selected, and transmit, for each type of broadcast packet, the at least one RLC block, via a satellite in a satellite network, using the one or more Walsh codes selected for the type of broadcast packet; and one or more terminals configured to:

receive the at least one RLC block for a selected type of broadcast packet from the satellite, recover broadcast content contained in the selected type of broadcast packets, and supply the recovered broadcast content to one or more broadcast clients.

16. The system of claim 15, wherein:

the gateway is further configured to simultaneously transmit the at least one RLC block via at least one additional satellite; and the one or more terminals are configured to receive the at least one RLC block for a selected type of broadcast packet from either the satellite or the at least one additional satellite.

17. The system of claim 15, wherein the gateway is further configured to:

monitor bandwidth usage for the satellite network; and dynamically increase or decrease one or more selected transmit data rates based, at least in part, on the monitored bandwidth usage.

18. The system of claim 15, wherein the gateway is further configured to segment the compressed data packets for each type of broadcast packet into a number of RLC blocks corresponding to the number of Walsh codes selected for the respective type of broadcast packet.

19. The system of claim 18, wherein the gateway is further configured to:

select multiple Walsh codes for a particular type of broadcast packet; and sequence the number of RLC blocks in an order corresponding to an assignment order of each Walsh code for the particular type of broadcast packet.

20. The system of claim 15, wherein the data packets are compressed using a dictionary based compression methodology.

21. The system of claim 20, wherein the gateway is further configured to:

select a compression dictionary available to terminals in the satellite network; and reset the compression dictionary at predetermined time intervals.

22. The system of claim 15, wherein the gateway is configured to encrypt the at least one RLC block.

23. The system of claim 22, wherein the gateway is further configured to:

store a predefined set encryption keys within terminals of the satellite network;

select a particular encryption key from the predefined set of encryption keys for encrypting the at least one RLC block; and transmit an index corresponding to the selected encryption key over the broadcast control channel.

24. The system of claim 23, wherein the gateway is further configured to:

select multiple encryption keys from the predefined set of encryption keys;

transmit an index corresponding to each of the multiple encryption keys;

create a new encryption key by applying a key generating algorithm to the multiple encryption keys; and encrypt the at least one RLC block using the new encryption key.

25. The system of claim 24, wherein the terminal is further configured to:

detect the one of more Walsh codes for each type of broadcast packet from the broadcast control channel;

receive and decode the transmitted at least one RLC block using the detected one or more Walsh codes;

decompress the at least one RLC block into the corresponding at least one type of broadcast packets; and supply each type of broadcast packet to one or more broadcast clients.

26. The system of claim 25, wherein the terminal is further configured to monitor channels defined by the detected one or more Walsh codes in order to receive and decode the transmitted at least one RLC block.

27. The system of claim 25, wherein the terminal is further configured to:

select multiple Walsh codes for a particular type of broadcast packet;

segment compressed data packets of the particular type of broadcast packet into multiple RLC blocks; and decompress the at least one RLC block by reassembling the multiple RLC blocks based on an assignment order of each Walsh code for the particular type of broadcast packet.

28. The system of claim 15, wherein multiple broadcast content can be transmitted within each beam of the satellite.

29. The system of claim 15, wherein the at least one RLC block are encrypted using a symmetric encryption algorithm.

30. The method of claim 1, wherein the at least one RLC block are encrypted using a symmetric encryption algorithm.

* * * * *